United States Patent
Collins et al.

(10) Patent No.: US 11,335,899 B2
(45) Date of Patent: May 17, 2022

(54) LITHIUM ION ENERGY STORAGE DEVICE CONTAINING A VAPOR DEPOSITED IODINE INTERFACIAL LAYER

(71) Applicant: International Business Machines Corporation, Armonk, NY (US)

(72) Inventors: John Collins, Tarrytown, NY (US); Ali Afzali-Ardakani, Ossining, NY (US); Joel P. de Souza, Putnam Valley, NY (US); Teodor K. Todorov, Yorktown Heights, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 16/397,580

(22) Filed: Apr. 29, 2019

(65) Prior Publication Data

US 2020/0343531 A1 Oct. 29, 2020

(51) Int. Cl.

| H01M 4/133 | (2010.01) |
|---|---|
| H01M 4/136 | (2010.01) |
| H01M 10/0565 | (2010.01) |
| H01M 4/66 | (2006.01) |
| C08K 3/04 | (2006.01) |
| C08K 5/00 | (2006.01) |
| H01M 10/0525 | (2010.01) |
| H01M 4/02 | (2006.01) |

(52) U.S. Cl.
CPC .............. *H01M 4/133* (2013.01); *C08K 3/04* (2013.01); *C08K 5/0016* (2013.01); *H01M 4/136* (2013.01); *H01M 4/668* (2013.01); *H01M 10/0565* (2013.01); *C08K 2201/001* (2013.01); *H01M 10/0525* (2013.01); *H01M 2004/028* (2013.01); *H01M 2300/0082* (2013.01)

(58) Field of Classification Search
CPC ...... H01M 4/133; H01M 4/136; H01M 4/668; H01M 10/0565; H01M 10/0525; H01M 2004/028; H01M 2300/0082; H01M 4/139; H01M 4/62; H01M 4/622; H01M 4/625; H01M 10/0566; C08K 3/04; C08K 5/0016; C08K 2201/001; Y02E 60/10
USPC ....................................................... 429/231.8
See application file for complete search history.

(56) References Cited

U.S. PATENT DOCUMENTS

8,658,304 B2   2/2014  Visco et al.
9,172,114 B2  10/2015  Chao et al.
(Continued)

*Primary Examiner* — Gary D Harris
(74) *Attorney, Agent, or Firm* — Scully, Scott, Murphy & Presser, P.C.; Daniel P. Morris, Esq.

(57) ABSTRACT

A catholyte-like material including a cathode material and an interfacial additive layer for providing a lithium ion energy storage device having low impedance is disclosed. The interfacial additive layer, which is composed of vapor deposited iodine, is present between the cathode material and an electrolyte layer of the device. The presence of such an interfacial additive layer increases the ion and electron mobile dependent performances at the cathode material interface due to significant decrease in the resistance/impedance that is observed at the respective interface as well as the impedance observed in the bulk of the device. The catholyte-like material of the present application can be used to provide a lithium ion energy storage device having high charge/discharge rates and/or high capacity.

11 Claims, 4 Drawing Sheets

(56) References Cited

U.S. PATENT DOCUMENTS

2002/0182508 A1* 12/2002 Nimon .................... H01M 4/40
                                                    429/231.95
2016/0049655 A1    2/2016  Fasching et al.
2017/0162901 A1    6/2017  Chen et al.

* cited by examiner

FIG. 4C ic device for at least the length that the device is being used. Sufficient energy storage device capacity can result in a power supply that is quite heavy and/or large compared to the rest of the electronic device. As such, smaller sized and lighter weight power supplies with sufficient energy storage are desired. Such power supplies can be implemented in smaller and lighter weight electronic devices in combination with lithium ion materials acting as the charge carrier; as lithium is the lightest and most electropositive charge carrier ion in the Periodic Table of Elements, lithium ion batteries and capacitors are considered the best fit for smaller, more energy dense energy storage devices.

LITHIUM ION ENERGY STORAGE DEVICE CONTAINING A VAPOR DEPOSITED IODINE INTERFACIAL LAYER

BACKGROUND

The present application relates to an energy storage device, and more particularly to a catholyte-like material that imparts low impedance to a lithium ion energy storage device.

In recent years, there has been an increased demand for electronic devices such as, for example, computers, mobile phones, tracking systems, scanners, medical devices, smart watches, power tools, remote systems and sensors, electric vehicles, internet of things (IOT) and fitness devices. One drawback with such electronic devices is the need to include a power supply within the device itself. Typically, an energy storage device such as, for example, a battery is used as the power supply of such electronic devices. Energy storage devices must have enough capacity to power the electronic device for at least the length that the device is being used. Sufficient energy storage device capacity can result in a power supply that is quite heavy and/or large compared to the rest of the electronic device. As such, smaller sized and lighter weight power supplies with sufficient energy storage are desired. Such power supplies can be implemented in smaller and lighter weight electronic devices in combination with lithium ion materials acting as the charge carrier; as lithium is the lightest and most electropositive charge carrier ion in the Periodic Table of Elements, lithium ion batteries and capacitors are considered the best fit for smaller, more energy dense energy storage devices.

In a typical lithium ion battery, a Li-charge storage based cathode material and an electrolyte are employed. In such batteries, the impedance at the interface between the cathode material and the electrolyte is high. Lithium ion batteries and other lithium ion charge storage devices having low impedance are sought after.

SUMMARY

A catholyte-like material including a cathode material and an interfacial additive layer for providing a lithium ion energy storage device having low impedance is disclosed. The interfacial additive layer, which is composed of vapor deposited iodine, is present between the cathode material and an electrolyte layer of the device. The presence of such an interfacial additive layer increases the ion and electron mobile dependent performances at the cathode material interface due to significant decrease in the resistance/impedance that is observed at the respective interface as well as the impedance observed in the bulk of the device. The catholyte-like material of the present application can be used to provide a lithium ion energy storage device having high charge/discharge rates and/or high capacity.

In one aspect of the present application, an energy storage device having low resistance/impedance is provided. In one embodiment, the energy storage device includes a cathode material composed of a mixture of a carbon based particle material, a lithium containing salt, and a lithium conductive plasticizing material. The energy storage device further includes an interfacial additive layer composed of vapor deposited iodine. The interfacial additive layer has a first surface that forms an interface with a surface of the cathode material. The energy storage device even further includes an electrolyte layer which conducts lithium ions and forms an interface with a second surface of the interfacial additive layer that is opposite the first surface of the interfacial additive layer.

In some embodiments and when the electrolyte layer is composed of a solid polymer electrolyte, the energy storage device can further include a second interfacial additive layer of vapor deposited iodine forming an interface with a surface of the electrolyte layer, and a second cathode material composed of a second mixture of a carbon based particle material, a lithium containing salt, and a lithium conductive plasticizing material forming an interface with the second interfacial additive layer.

In some embodiments, and when the electrolyte layer is composed of a liquid electrolyte, the energy storage device includes an anode material such as, for example, a lithium ion generator material, a lithium intercalation active material, lithium plating active material, lithium alloying active material or lithium hosting active material forming an interface with the electrolyte layer.

In another aspect of the present application, a method of forming an energy storage device is provided. In one embodiment, the method includes providing a cathode material composed of a mixture of a carbon based particle material, a lithium containing salt, and a lithium conductive plasticizing material. Next, an interfacial additive layer composed of iodine is vapor deposited on a surface of the cathode material. An electrolyte layer that conducts lithium ions is then formed on the interfacial additive layer.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

As stated above, the present application provides a catholyte-like material composed of a cathode material (to be defined in greater detail herein below) and a vapor deposited iodine interfacial additive layer. The vapor deposited iodine interfacial additive layer of the present application is formed between the cathode material and an electrolyte layer of an energy storage device. The presence of such an interfacial additive layer increases the ion and electron mobile dependent performances at the cathode material interface, where the increased electrochemical performance of the composite cathode/interfacial additive material is therefore applicable to full energy storage device cell(s) and their consequential increase in electrochemical energy storage device performance. Hence, the significant decrease in the resistance/impedance at the respective cathode interface, as can be observed commonly in the prior art, can be applicable to full device performance as well as partially attributed to defining advantageous impedance magnitudes of ion mobility observed in the bulk of the symmetric or asymmetric energy storage device.

Moreover, the catholyte-like material of the present application acts as both a Li-charge storage based cathode where the interface of the cathode material has improved charge mobility and energy storage performance due to the extremely low impedance observed at the interfacial-additive containing cathode/electrolyte or catholyte interface. The applications and implications of such a material are far reaching—from extremely high rates of charge and discharge to high, rechargeable capacity energy storage to safe Li ion and/or Li-metal based energy storage devices. These and other aspects of the present application will now be further elaborated upon.

Figure 1:
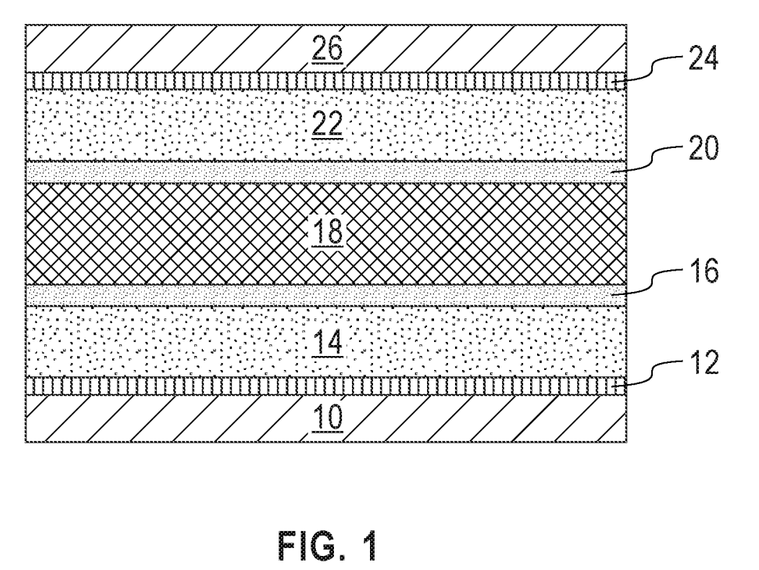
FIG. 1 is a cross sectional view of an energy storage device in accordance with an embodiment of the present application.

Referring first to FIG. 1, there is illustrated an energy storage device in accordance with an embodiment of the present application. The energy storage device of FIG. 1 includes an interfacial additive layer 16 composed of vapor deposited iodine located between a cathode material 14 and a solid polymer electrolyte layer 18 that conducts lithium ions. The cathode material 14 can be located on a surface of a first current collector 10. In some embodiments, a first conductive adhesive 12 is located between the cathode material 14 and the first current collector 10. The energy storage device of FIG. 1 further includes a second interfacial additive layer 20 composed of vapor deposited iodide forming an interface with the solid polymer electrolyte layer 18, a second cathode material 22 forming an interface with the second interfacial additive layer 20, and a second current collector 26 located on a surface of the second cathode material 22. A second conductive adhesive 24 can be located between the second cathode material 22 and the second current collector 26.

Although not shown in FIG. 1, the illustrated energy storage device can be present on a surface of a base substrate. If present, the base substrate may include any conventional material that is used as an electrically conductive substrate for a energy storage device. Examples of such a substrate may include but are not limited to copper, aluminum, nickel, titanium or respective alloys thereof. The substrate may be mechanically or chemically attached, adhered or bonded with the silicon based electrode. In one embodiment, the base substrate is a bulk semiconductor substrate. By "bulk" it is meant that the base substrate is entirely composed of at least one semiconductor material. In one example, the base substrate may be entirely composed of silicon which may be single crystalline. In some embodiments, the bulk semiconductor substrate may include a multilayered semiconductor material stack including at least two different semiconductor materials. In one example, the multilayered semiconductor material stack may comprise, in any order, a stack of Si and a silicon germanium alloy. In another embodiment, the multilayered semiconductor material may comprise, in any order, a stack of Si and single or multiple silicon-based alloys, such as silicon-germanium or carbon-doped silicon-based alloys.

In some embodiments, the base substrate may have a non-textured (flat or planar) surface. The term "non-textured surface" denotes a surface that is smooth and has a surface roughness on the order of less than 100 nm root mean square as measured by profilometry or Atomic Force Microscopy. In yet another embodiment, the base substrate may have a textured surface. In such an embodiment, the surface roughness of the textured substrate can be in a range from 100 nm root mean square to 100 µm root mean square as also measured by profilometry or Atomic Force Microscopy. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the base substrate is composed of a plurality of high surface area 3-dimensional features. In some embodiments, a plurality of metallic masks are used, which may be formed by depositing a layer of a metallic material and then performing an anneal. During the anneal, the layer of metallic material melts and balls-ups such that de-wetting of the surface of the base substrate occurs.

First current collector 10 of the energy storage device may be formed contacting a surface of the base substrate. The first current collector 10 may include any conductive metal or conductive metal nitride such as, for example, titanium (Ti), platinum (Pt), nickel (Ni), aluminum (Al) or titanium nitride (TiN). The first current collector 10 may include a single layer of a conductive metal or conductive metal nitride, or a material stack including at least two different conductive metals and/or conductive metal nitrides. In one example, the first current collector 10 can be composed of aluminum. The first current collector 10 can be formed utilizing deposition techniques well known to those skilled in the art.

The first conductive adhesive 12 is composed of any adhesive material that can conduct lithium ions. Illustrative examples of such a conductive adhesive include, but are not limited to, commonly used silver epoxy. Illustrative examples of conductive adhesive materials that can be used as the conductive adhesive 12 include, but are not limited to, polypyrrol (Ppy), polythiophene, polyaniline (PANI), polyphenylene sulfide, Ppy/carbon nanotube composites, poly[3-(potassium-4-butanoate) thio-phene] (PPBT) and poly(ethylene glycol) (PEG) composites, and poly polystyrene sulfonate (PEDOT) and carbon (e.g., CNT) composites. In one exemplary embodiment, the first conductive adhesive 12 is composed of polyaniline (PANI).

In some embodiments, the conductive adhesive material is mixed with a lithium containing salt. Illustrative lithium containing salts that can be used include, but are not limited to, lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate (LiBOB). In one embodiment, a mixture of PANI and bis(trifluoromethanesulfonyl)imide (LiTFSI) is employed as the first conductive adhesive 12. In embodiments in which a lithium containing salt is used in conjugation with the polymeric adhesive material, the mixture includes from 20 weight percent to 40 weight percent of the conductive adhesive and from 10 weight percent to 45 weight percent of the lithium containing salt.

The first conductive adhesive 12 is a continuous layer that can have a thickness from 20 nm to 50 microns, depending on the composition of the conductive adhesive; although other thicknesses are possible and can be used as the thickness of the first conductive adhesive 12. The first conductive adhesive 12 can be formed utilizing a deposition process such as, solution deposition, hot pressing, cold pressing, slurry casting, blade casting, spin coating, doctor blade coating or spray casting—depending on the composition of the conductive adhesive used followed by controlled temperature and pressure conditions. The first conductive adhesive 12 may be formed upon a surface of the first current collector 10.

Cathode material 14 that can be used in the present application includes a mixture of a carbon based particle material, a lithium containing salt, and a lithium conductive plasticizing material. The mixture can be formed utilizing techniques that are well known to those skilled in the art.

In one embodiment, the mixture that provides the cathode material 14 can include from 4 weight to 10 weight percent of the carbon based particle material, from 30 weight to 50 weight percent of the lithium containing salt, and from 30 weight percent to 60 of the lithium conductive plasticizing material. In another embodiment, the mixture that provides the cathode material 14 can include from 2 weight to 10 weight percent of the carbon based particle material, from 30 weight to 45 weight percent of the lithium containing salt, and from 45 weight percent to 60 weight percent of the lithium conductive plasticizing material.

The carbon based particle material that can be present in the mixture that provides the cathode material 14 of the present application may include carbon nanotubes (CNTs), graphene, graphite, surface functionalized and/or passivated carbon based materials, reduced and functionalized graphene oxide materials, borophene type materials, carbon/silicon composite type materials, or any mixture thereof. In one embodiment, the carbon based particle material includes CNTs. The CNTs may be either single-walled nanotubes or multiwalled nanotubes. The CNTs that can be used in the present application typically have a diameter from 0.2 nm to 10 nm, and a length of from 14 nm to 5000 nm.

The lithium containing salt that can be present in the mixture that provides the cathode material 14 of the present application includes at least one of lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate (LiBOB). In one example, the lithium containing salt that can be present in the mixture that provides the cathode material 14 includes LiTFSI.

The lithium conductive plasticizing material that can be present in the mixture that provides the cathode material 14 of the present application may include succinonitrile, poly(ethylene glycol) (PEG), aprotic organic solvent, or dimethylsulfoxide (DMSO) or any mixture of such plasticizing materials.

In one example, the cathode material 14 that can be used in the present application includes a mixture of carbon nanotubes, succinonitrile, and lithium bis(trifluoromethanesulfonyl)imide (LiTFSI).

The cathode material 14 may be provided to a surface of either the first current collector 12 or the first conductive adhesive 14 utilizing deposition techniques well known to those skilled in the art. The as deposited cathode material 14 may have a thickness from less than 5 microns to more than 5 microns, with a preferred thickness range of 20 to 100 microns, although other thicknesses for the as deposited cathode material 14 can be used in the present application.

The interfacial additive layer 16 composed of vapor deposited iodine is formed on a surface of the cathode material 14. The interfacial additive layer 16 can be formed prior to, or after, providing the cathode material 14 to the surface of either the first current collector 10 or the first conductive adhesive 12 layer. The interfacial additive layer 16 is formed utilizing a vapor deposition process. Vapor deposition is a coating deposition process in which a material (in the present application iodine) in a vapor state is condensed through the processes of condensation on a substrate, chemical reaction or conversion to form a solid layer over a substrate (in the present application the cathode material 14). In one embodiment, the vapor deposition includes chemical vapor deposition or physical vapor deposition. In another embodiment the creation of the interfacial additive vapor can be achieved in ambient conditions, where the vapor material is directed to contact the substrate (in the present application cathode material 14). The application of heat (above room temperature) to facilitate or speed up the process for the generation of iodine vapor from an iodine source can also be utilized. The vapor deposition can be formed at a temperature of 25° C. or greater utilizing any iodine source material such as, for example, liquid iodine. The interfacial additive layer 16 can have a thickness from 1 nm to 50 nm.

The solid polymer electrolyte layer 18 which forms an interface with the interfacial additive layer 16 includes any solid polymer material that can conduct Li ions. In one embodiment, the solid polymer electrolyte layer 18 is composed of a mixture of a polymer structure host material, a Li-conductive/plasticizing material and a lithium containing salt. In such an embodiment, the mixture includes from 35 weight percent to 50 weight percent of the polymer structure host material, from 15 weight percent to 25 weight percent of the conductive/plasticizing material, and from 30 weight percent to 45 weight percent of the lithium containing salt, where the polymer host material and conductive/plasticizing material are dissolved into anhydrous acetonitrile with a solid:solvent ratio between 1:2 to 1:10, with a preferred ratio of 1:3. The mixture can be made utilizing techniques well known to those skilled in the art.

Illustrative examples of polymer structure host materials include at least one of poly(ethylene oxide) (PEO), poly(propylene oxide) (PPO), poly(dimethylsiloxane), poly(vinyl chloride), or polycaprolactone. Illustrative examples of Li-conductive/plasticizing material include at least one of succinonitrile, poly(ethylene glycol) (PEG), an aprotic organic solvent, or dimethylsulfoxide (DMSO). Illustrative lithium containing salts that can be used in forming the solid polymer electrolyte layer 18 include, but are not limited to, lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate (LiBOB).

In some embodiments (not shown), the solid polymer electrolyte layer 18 includes a separator (or dielectric region). The separator can be composed of at least one of polyacrylnitrile (PAN), polyethylene oxide (PEO) based copolymer matrices or structural membranes, a quarternized polysulfone membrane, electrospun polyvinylidene fluoride, or a methylmethacrylate (MMA)/polyethylene (PE) composite.

The solid polymer electrolyte layer 18 may be formed utilizing a deposition process such as, drop casting, pipette casting, blade coating, spin coating, spray coating, etc. followed by controlled temperature and pressure conditions or plating. In one embodiment, the solid-state electrolyte layer 18 is formed by sputtering utilizing any conventional target source material in conjunction with reactive or inert gasses. For example, sputtering may be performed in the presence of at least a nitrogen-containing ambient. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 50% to 100%, with a nitrogen content within the ambient from 99.9% to 100% being more typical.

In some embodiments, a second interfacial additive layer 20 composed of vapor deposited iodine forms an interface with a physically exposed surface of the solid polymer electrolyte layer 18. The second interfacial additive layer 20 is formed on a physically exposed surface of the solid polymer electrolyte layer 18 by utilizing a vapor deposition process, as defined above for forming the interfacial additive layer 16. The second interfacial additive layer 20 can have a thickness from 1 nm to 50 nm.

The second cathode material 22 is composed of a second mixture of a carbon based particle material, as defined above, a lithium containing salt, as defined above, and a lithium conductive plasticizing material, as defined above. The amounts of each of the carbon based particle material, the lithium containing salt, and the lithium conductive plasticizing material are as defined above for the mixture that provide conductive material 14. The second mixture can be formed utilizing techniques that are well known to those skilled in the art. The second mixture that provides the second cathode material 22 can be compositionally the same as, or compositionally different from the mixture that provides the cathode material 14. In one embodiment, the mixture that provides the cathode material 14 and the second mixture that provides the second cathode material 22 are compositionally the same and both mixtures are composed of carbon nanotubes, succinonitrile, and lithium bis(trifluoromethanesulfonyl)imide (LiTFSI). The second cathode material 22 can be formed utilizing deposition techniques well known to those skilled in the art.

In some embodiments, a second conductive adhesive 24 forms an interface with the second cathode material 22. In some embodiments, the second conductive adhesive 24 is omitted. The second conductive adhesive 24 may include one of the materials or mixture of materials, with or without a lithium containing salt, as defined above for the first conductive adhesive 12. The second conductive adhesive 24 may be formed utilizing one of the deposition methods mentioned above for forming the first conductive adhesive 12. The second conductive adhesive 24 can have a thickness from 20 nm to 50 microns, depending on the composition of the conductive adhesive used.

A second current collector 26 forms an interface with a surface of either the second conductive adhesive 24 or the second cathode material 22. The second current collector 26 may include one of the a conductive metal or conductive metal nitride such as, for example, titanium (Ti), platinum (Pt), nickel (Ni), aluminum (Al) or titanium nitride (TiN). The second current collector 26 can be composed of a compositionally same, or compositionally different conductive metal or conductive metal nitride. In one example, the first current collector 10 and the second current collector 26 are both composed of aluminum (Al).

Energy source devices such as exemplified in FIG. 1 have a low impedance. In one example, energy source devices such as exemplified in FIG. 1 can have an impedance of 24 ohms (12.12 ohms/$cm^2$) or less, and an interfacial area between the catholyte-like material (i.e., the combination of the cathode material 14 and the vapor deposited iodine interfacial additive layer 16) and the solid polymer electrolyte layer 18 has a charge resistance of less than 12.5 ohms/$cm^2$. These aspects of the present application will become more apparent from the discussion provided herein below for FIG. 3.

Figure 2:
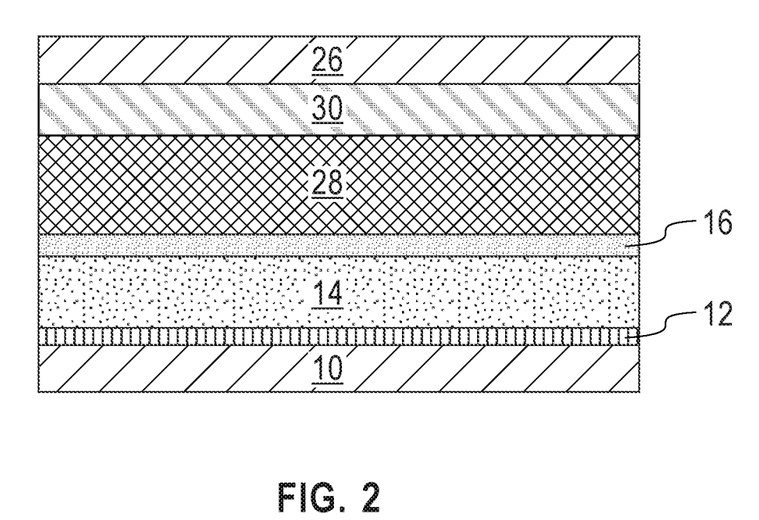
FIG. 2 is a cross sectional view of an energy storage device in accordance with another embodiment of the present application.

Referring now to FIG. 2, there is illustrated an energy storage device in accordance with another embodiment of the present application. The energy storage device of FIG. 2 includes an interfacial additive layer 16 composed of vapor deposited iodine located between a cathode material 14 and a liquid electrolyte 28 that conducts lithium ions; the energy storage device of FIG. 2 is typically encased within a battery housing material (e.g., coin cells). The cathode material 14 and the interfacial additive layer 16 of this embodiment are the same as that described above for the energy storage device illustrated in FIG. 1.

The cathode material 14 of this embodiment can be located on a surface of a first current collector 10. A base substrate, as defined above, can be located beneath the first current collector 10. In some embodiments, a first conductive adhesive 12 is located between the cathode material 14 and the first current collector 10. The first current collector 10 and the first conductive adhesive 12 of this embodiment are the same as that described above for the energy storage device illustrated in FIG. 1.

The energy storage device of FIG. 2 further includes an anode material 30 forming an interface with the liquid electrolyte 28, and a second current collector 26 forming an interface with the anode material 30. The second current collector 26 of this embodiment is the same as that described above for the energy storage device depicted in FIG. 1.

The liquid electrolyte 28, which may or may not include a separator as defined above, includes any lithium ion conducting liquid electrolyte. Examples of lithium ion conducting liquid electrolytes that can be used as the liquid electrolyte 28 include, but are not limited to, $LiPF_6$ salt in ethylene carbonate (EC) and diethyl carbonate (DEC), $LiPF_6$ salt in ethylene carbonate (EC) and dimethyl carbonate (DMC), $LiPF_6$ salt in ethylene carbonate (EC) and dimethyl carbonate (DMC) and diethyl carbonate (DEC), etc.

The anode material 30 is composed of a lithium ion generator material, a lithium intercalation active material, lithium plating active material, lithium alloying active material or lithium hosting active material. Examples of such materials that can be used as the anode material 30 of the present application include, but are not limited to, lithium metal, a lithium-base alloy such as, for example, $Li_xSi$, pre-lithiated carbon based material, pre-lithiated silicon based material or a lithium-based mixed oxide such as, for example, lithium titanium oxide ($Li_2TiO_3$). The anode material 30 can be formed utilizing deposition techniques that are well known to those skilled in the art. In some embodiments, the anode material 30 can be formed by sputtering.

Energy source devices such as exemplified in FIG. 2 have a low impedance, high rates of charge and discharge, and a high capacity. In one embodiment, energy storage devices such as shown in FIG. 2 have a rate of charging from 0.1 milliAmp (mA) to 5 mA, a rate of discharging from 0.1 mA to 5 mA, and a discharge capacity from 0.25 mAh/cm$^2$ to greater than 5 mAh/cm$^2$. These aspects of the present application will become more apparent from the discussion provided herein below for FIGS. 4A, 4B and 4C.

As described in more detail below and for an energy storage device such as illustrated in FIG. 1, the catholyte-like material (i.e., combination of cathode material and vapor deposited iodine interfacial additive layer) of the present application has its' electrochemical impedance impact modeled by Electrochemical Impedance Spectroscopy (EIS) measurements which show a reduction in interfacial impedance between the catholyte like material and the solid polymer electrolyte when the inventive catholyte-like material is utilized.

In the following example, a single symmetric cell (C1) having a cell area of 1.98 cm$^2$ was used that included a first current collector composed of Al, a first conductive adhesive composed of silver epoxy, a first cathode material composed of a mixture of carbon nanotubes, succinonitrile and LiTFSI, a first vapor deposited iodine interfacial additive layer, a solid polymer electrolyte layer of a mixture of polycaprolactone, succinonitrile and bis(trifluoromethanesulfonyl)imide (LiTFSI) with a polyacrylonitrile (PAN)-based separator, a second vapor deposited iodine interfacial additive layer, a second cathode material composed of a second mixture of carbon nanotubes, succinonitrile and LiTFSI, a second conductive adhesive composed of silver epoxy, and a second current collector composed of Al. The first and second current collectors were both wired to include an electrical connection to each end of the cell (C1). This cell (C1) was analyzed via Electrochemical Impedance Spectroscopy (EIS) over the frequency range of 1 MHz to 251 mHZ with applied potential amplitude of 50 mV.

Figure 3:
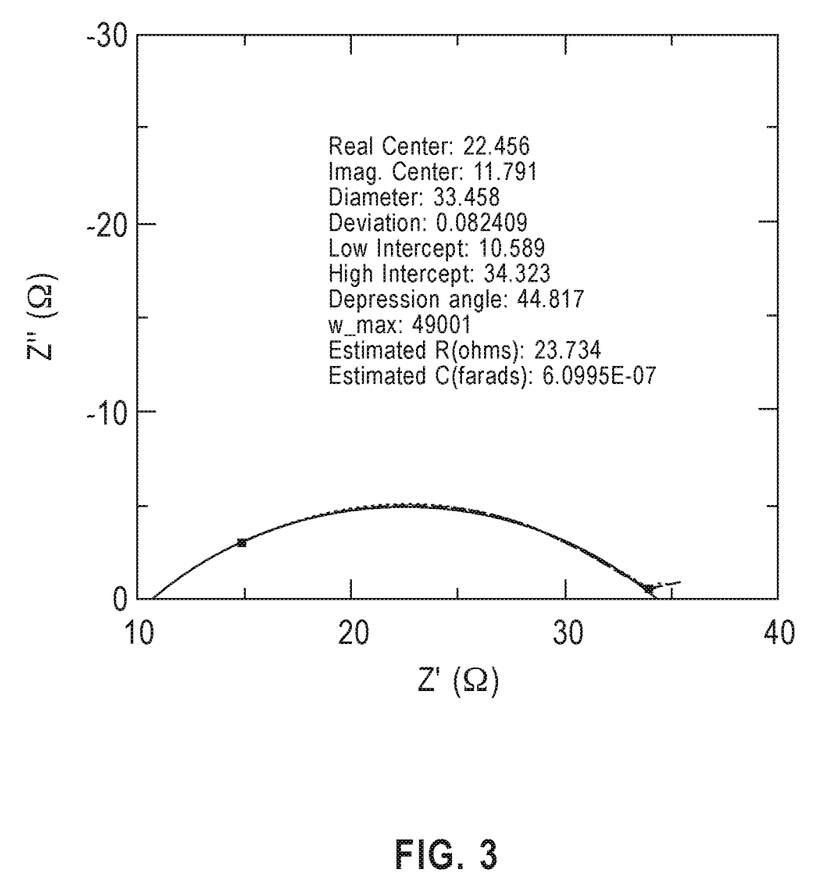
FIG. 3 is a graph plotting real part of impedance, Z' in ohms (Ω) vs. imaginary part of impedance, Z" in ohms (Ω) for a symmetrical energy storage device (i.e., cell), showing both experimental data and circle-fitted results, in accordance with an embodiment of the present application.

A Nyquist plot, as shown in FIG. 3, is a graph used in EIS that plots the real part of a battery impedance (associated with real cell resistance) on the X-axis and the imaginary part (associated with cell capacitance) of the battery impedance on the Y-axis over a range of frequencies, e.g., each data point (typically) on the Nyquist plot is one given frequency. The lower frequencies are on the right side of the graph (X-axis) and higher frequencies are on the left (of the X-axis) and the Y-axis shows negative values representing the imaginary part of the impedance.

Generally, in EIS analysis, $R_s$ is measured/estimated as the real part of the impedance at the higher or highest frequency data point of the Nyquist plot. $R_s$ is a pure resistive component denoted as ohmic or series type resistance, between the electrodes of the battery and can often be associated with contact resistance of the cell. Generally, resistor components refer to resistor like elements in the electrochemical model makeup of the cell; capacitor elements refer to an impedance component of the cell which has a phase change (towards –90 degrees) in its' AC current response with respect to frequency—an EIS element with a high degree of capacitance character (e.g., a "C" element) illustrates a surface often associated with unintimate contact (delaminated layers); constant phase elements (CPE) are elements in cell impedance which can maintain a constant phase of AC current response over a given frequency range (often associated with transition layers grown or established in-situ). Generally, in EIS analysis of cells with high performing ion diffusion, electrode/electrolyte interface ion transport processes and/or mass transport (electrolyte migration) associated with the electrolyte, the Warburg impedance measurement frequency component of the cell ($W_{s1}$) is observed as a near 45 degree "straight, diagonal" section of the Nyquist plot.

Notably, FIG. 3 is a graph plotting real part of impedance, Z' in ohms (Ω) vs. imaginary part of impedance, Z'' in ohms (Ω) for the symmetric cell described above. The resistance to move/transfer Li ion based charge through/across the inventive catholyte-like material (i.e., cathode material and vapor deposited iodine interfacial additive layer) interface(s) as measured via a circle fit (the solid line is the circle fit; the dots are the experimental data points) of the symmetric cell Nyquist plot was determined to be 23.74 ohms (11.98 ohms/cm$^2$). This data shows the inventive catholyte-like material (i.e., cathode material and vapor deposited iodine interfacial additive layer) can be used to provide a cell have a low impedance.

In another example, a cell (C2) having an area of 1.98 cm$^2$ was provided that included a first current collector composed of Al, a conductive adhesive composed of silver epoxy, a cathode material composed of a mixture of carbon nanotubes, succinonitrile and LiTFSI, a vapor deposited iodine interfacial additive layer, a liquid electrolyte composed of $LiPF_6$ salt in EC/DEC, an anode composed of Li foil, and a second current collector composed of copper. This cell (C2) was subjected to a constant applied current test (charge with 1.0 milliAmps), a constant applied current discharge test (0.5 milliAmps) and a charge saturation hold 3.5 V hold step, where the voltage of the cell was held at 3.5 V when the charge step reached 3.5 V, until the current of the cell dropped below 25% of the applied charge current, respectively. The data for each of the constant current test, constant current discharge test, and charge saturation hold 3.5 V hold step are shown in FIGS. 4A, 4B and 4C, respectively.

Figure 4A:
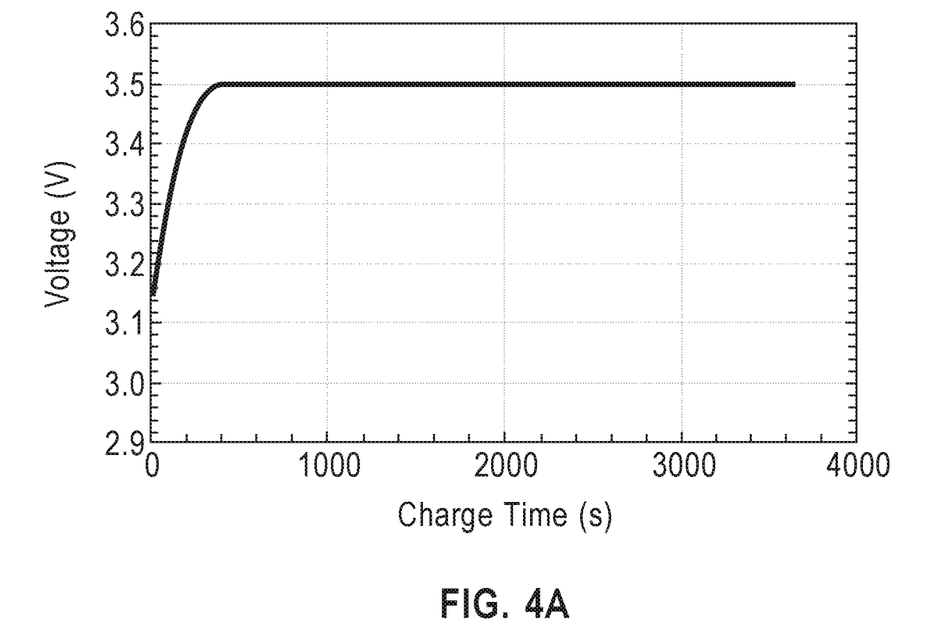
FIG. 4A is a graph of charge time (s) vs. voltage (V) at a constant current charge of 1 milliAmp for a non-symmetrical energy storage device (i.e., cell) in accordance with another embodiment of the present application.
Figure 4B:
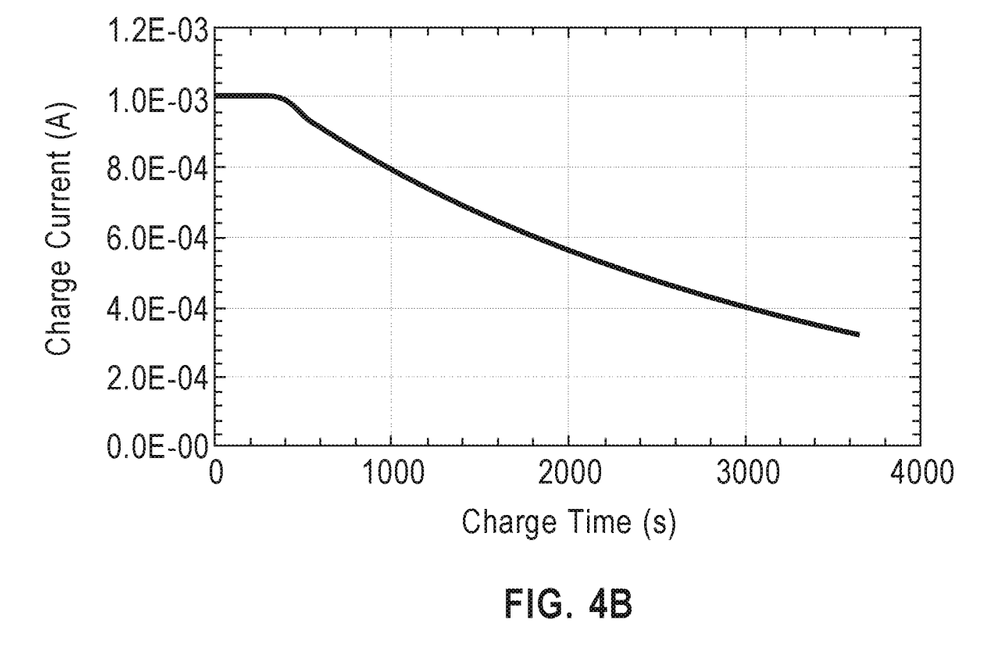
FIG. 4B is a graph of charge time (s) vs. current (A) at a constant voltage hold of 3.5 V applied during the charge saturation step for the energy storage device described in FIG. 4A.
Figure 4C:
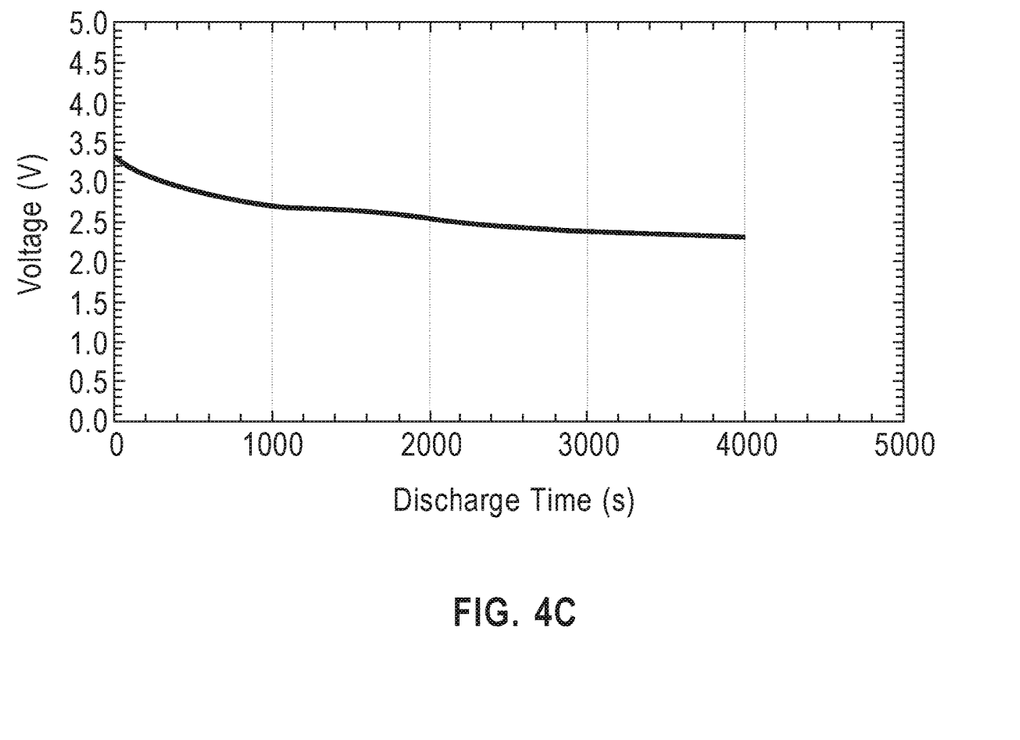
FIG. 4C is a graph of discharge time (s) vs. voltage (v) for the energy storage device described in FIG. 4A.

From the data shown in FIGS. 4A, 4B and 4C, cell 2 has a charge capacity of 0.32 mAh/cm$^2$, and a discharge capacity of 0.28 mAh/cm$^2$, as observed during the initial cycling (applied constant charge current, charge saturation at 3.5 V hold step, and applied constant discharge current, as described above) of the cell. The testing of this full cell containing the catholyte-like material for the respective cathode material, which enables very low charge transfer resistance across the catholyte-like material cathode interface/surface, illustrates high cell capacity capability at high rates of charge and discharge. Hence, the interfacial additive treatment of the cathode material creates a catholyte-like cathode material which can be utilized in a full Li-ion cell setup, as observed in FIG. 2, and result in high electrochemical performance when included in a Li-material and/or Li-metal containing full cell.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. An energy storage device comprising:
    a first cathode material composed of a first mixture of a carbon based particle material, a lithium containing salt, and a lithium conductive plasticizing material;
    a first interfacial additive layer composed of vapor deposited iodine, wherein the first interfacial additive layer has a first surface forming an interface with a surface of the cathode material;
    an electrolyte layer that conducts lithium ions forming an interface with a second surface of the first interfacial additive layer that is opposite the first surface of the first interfacial additive layer, wherein the electrolyte layer is a solid polymer electrolyte;
    a second interfacial additive layer composed of vapor deposited iodine forming an interface with the solid polymer electrolyte; and
    a second cathode material forming an interface with the second interfacial additive layer, wherein the second cathode material is composed of a second mixture of a carbon based particle material, a lithium containing salt, and a lithium conductive plasticizing material.

2. The energy storage device of claim 1, further comprising a cathode current collector located beneath the first cathode material.

3. The energy storage device of claim 2, further comprising a first conductive adhesive located between the cathode current collector and the first cathode material.

4. The energy storage device of claim 1, wherein the first cathode material mixture comprises 2 weight to 10 weight percent of the carbon based particle material, from 30 weight to 45 weight percent of the lithium containing salt, and from 45 weight percent to 60 of the lithium conductive plasticizing material.

5. The energy storage device of claim 1, wherein the carbon based particle material comprise carbon nanotubes (CTs), graphene, graphite, surface functionalized and/or passivated carbon based materials, reduced and functionalized graphene oxide materials, borophene type materials, or carbon/silicon composite type materials and mixtures thereof.

6. The energy storage device of claim 1, wherein the lithium containing salt comprises lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate (LiBOB).

7. The energy storage device of claim 1, wherein the lithium conductive plasticizing material comprises succinonitrile, poly(ethylene glycol) (PEG), aprotic organic solvent, or dimethylsulfoxide (DMSO).

8. An energy storage device comprising:
    a cathode material composed of a mixture of a carbon based particle material, a lithium containing salt, and a lithium conductive plasticizing material, wherein the carbon based particle material comprises carbon nanotubes, the lithium conductive plasticizing material comprises succinonitrile, and the lithium containing salt comprises lithium bis(trifluoromethanesulfonyl)imide (LiTFSI);
    an interfacial additive layer composed of vapor deposited iodine, wherein the interfacial additive layer has a first surface forming an interface with a surface of the cathode material; and
    an electrolyte layer that conducts lithium ions forming an interface with a second surface of the interfacial additive layer that is opposite the first surface of the interfacial additive layer.

9. The energy storage device of claim 1, wherein the first mixture is compositionally the same as the second mixture, and the first mixture and the second mixture that provide the first cathode material and the second cathode material, respectively are both composed of carbon nanotubes, succinonitrile, and lithium bis(trifluoromethanesulfonyl)imide (LiTFSI).

10. The energy storage device of claim 3, further comprising a second conductive adhesive located on the second cathode material, and a second cathode collector located on the second conductive adhesive.

11. The energy storage device of claim 1, wherein an interfacial area between the first interfacial additive layer and the solid polymer electrolyte has a charge resistance of less than 12.5 ohms/cm$^2$.

* * * * *